US010267685B1

(12) United States Patent
Xu et al.

(10) Patent No.: US 10,267,685 B1
(45) Date of Patent: Apr. 23, 2019

(54) SYSTEMS AND METHODS FOR ADJUSTING OPTICAL SECURITY SENSOR MIRRORS

(71) Applicant: Honeywell International Inc., Morristown, NJ (US)

(72) Inventors: Guobin Xu, Shenzhen (CN); Haidong Xu, Shenzhen (CN); Ning Zhang, Shenzhen (CN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/856,328

(22) Filed: Dec. 28, 2017

(51) Int. Cl.
*G01J 5/08* (2006.01)
*G02B 15/00* (2006.01)
*G02B 26/08* (2006.01)
*G01J 5/34* (2006.01)

(52) U.S. Cl.
CPC ............. *G01J 5/0806* (2013.01); *G01J 5/084* (2013.01); *G01J 5/34* (2013.01); *G02B 15/00* (2013.01); *G02B 26/0816* (2013.01)

(58) Field of Classification Search
CPC ............. G01J 5/0806; G01J 5/084; G01J 5/34
See application file for complete search history.

(56) References Cited

U.S. PATENT DOCUMENTS

| 4,551,711 | A | * | 11/1985 | Akiyama | ............... G08B 13/19 250/342 |
| 5,026,990 | A | * | 6/1991 | Marman | ............... G08B 13/19 250/342 |
| 2006/0266944 | A1 | | 11/2006 | Chi et al. | |
| 2008/0316025 | A1 | | 12/2008 | Cobbinah et al. | |
| 2012/0013739 | A1 | | 1/2012 | Peterson et al. | |

* cited by examiner

*Primary Examiner* — Hugh H Maupin
(74) *Attorney, Agent, or Firm* — Husch Blackwell LLP

(57) ABSTRACT

Systems and methods for adjusting a focal length of a mirror are provided. Some systems can include an adjustment device having a slot, a mirror that is rotatable about an axis, and a drive coupled to the mirror and configured to engage the slot, wherein movement of the adjustment device can cause the drive to move within the slot upwards or downwards in accordance with a slope of the slot, thereby rotating the mirror about the axis.

19 Claims, 13 Drawing Sheets

SYSTEMS AND METHODS FOR ADJUSTING OPTICAL SECURITY SENSOR MIRRORS

FIELD

The present invention relates generally to optical security sensors. More particularly, the present invention relates to optical security sensors with adjustable mirrors.

BACKGROUND

Security systems are known to detect threats within a secured area, and such threats include events that represent a risk to human safety or a risk to assets.

Security systems typically include one or more security sensors that detect the threats within the secured area. For example, smoke, motion, and/or intrusion sensors are distributed throughout the secured area in order to detect the threats.

Intruders may be detected by active or passive devices. For example, intruders may be detected via switches placed on doors or windows of the secured area. Alternatively, the secured area may be monitored via passive infrared (PIR) detectors and/or security cameras that detect motion.

A known PIR detector includes an optical mirror that can be focused. However, adjusting the optical mirror on the PIR detector to focus the optical mirror can be difficult, frustrating, and time consuming. Therefore, a need exists for improved systems and methods for adjusting the optical mirror of the PIR detector.

DETAILED DESCRIPTION

Figure 1:
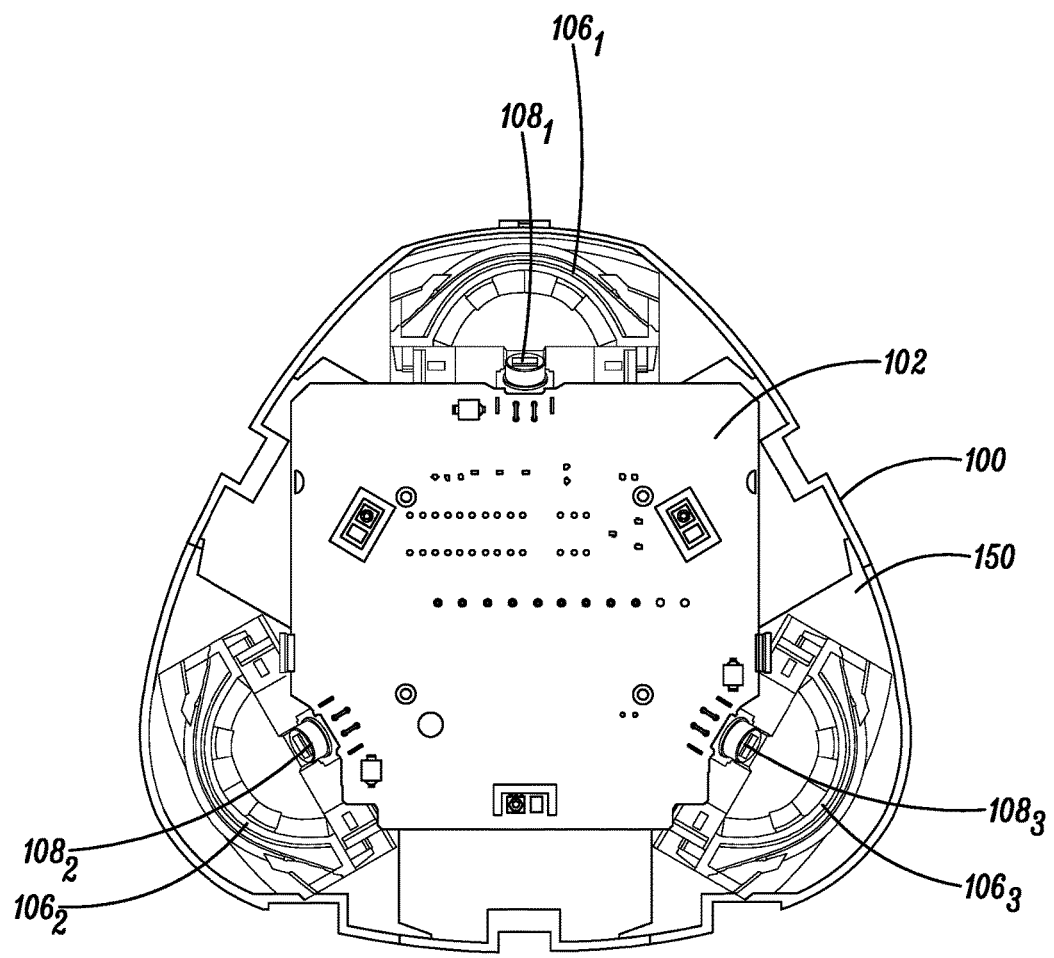
FIG. 1 illustrates a passive infrared detector in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for adjusting a focal length of a mirror included in a passive infrared (PIR) detector that can be included within a security system and report threats to a control panel of the security system. For example, the focal length of the mirror may be adjusted to accommodate a mounting height of the PIR detector, and by adjusting the focal length of the mirror, passive infrared (i.e. "pyro") sensors included in the PIR detector can receive a strong signal and accurately detect motion within the secured area.

In some embodiments, an adjustment device, such as a rotatable ring, can simultaneously adjust the focal length of multiple mirrors included in the PIR detector via movement of the adjustment device. For example, in some embodiments, the PIR detector can include three mirrors, each of the mirrors may be coupled to the adjustment device, and movement of the adjustment device can cause all three of the mirrors to simultaneously rotate, thereby changing the focal length of each of the three mirrors identically and in tandem. Accordingly, the focal length of the PIR detector may be adjusted quickly and in one step.

In some embodiments, the focal length of each of the mirrors can accommodate the mounting height of the PIR detector. For example, in some embodiments, the PIR detector can be mounted on a ceiling, and the focal length of each of the mirrors can correspond to a height of the ceiling. By adjusting the single adjustment device, each of the mirrors can be simultaneously adjusted to accommodate the height of the ceiling.

FIG. 1 illustrates a PIR detector 100 in accordance with disclosed embodiments. For example, the PIR detector 100 can include a housing 150, a printed circuit board 102, one or more mirrors $106_1$, $106_2$, $106_3$, and one or more pyro sensors $108_1$, $108_2$, $108_3$. Each of the mirrors $106_1$, $106_2$, $106_3$ can correspond with a respective one of the pyro sensors $108_1$, $108_2$, $108_3$ and can reflect or refract infrared light or visual light toward a respective one of the pyro sensors $108_1$, $108_2$, $108_3$. Then, one or more of the pyro sensors $108_1$, $108_2$, $108_3$ can transmit signals to processing circuitry on the printed circuit board 102 for processing and analyzing to detect motion, a presence of intruders, or another type of threat within a secured area based on the infrared light detected by the pyro sensors $108_1$, $108_2$, $108_3$.

The PIR detector 100 illustrated in FIG. 1 includes three mirrors $106_1$, $106_2$, $106_3$ and three pyro sensors $108_1$, $108_2$, $108_3$. However, it is to be understood the more or less than three mirrors $106_1$, $106_2$, $106_3$ and three pyro sensors $108_1$, $108_2$, $108_3$ can be included. Furthermore, while FIG. 1 illustrates the PIR detector 100, it is to be understood that the mirrors $106_1$, $106_2$, $106_3$ and the pyro sensors $108_1$, $108_2$, $108_3$ could be used in connection with another type of detector as would be known by one of ordinary skill in the art.

Figure 2:
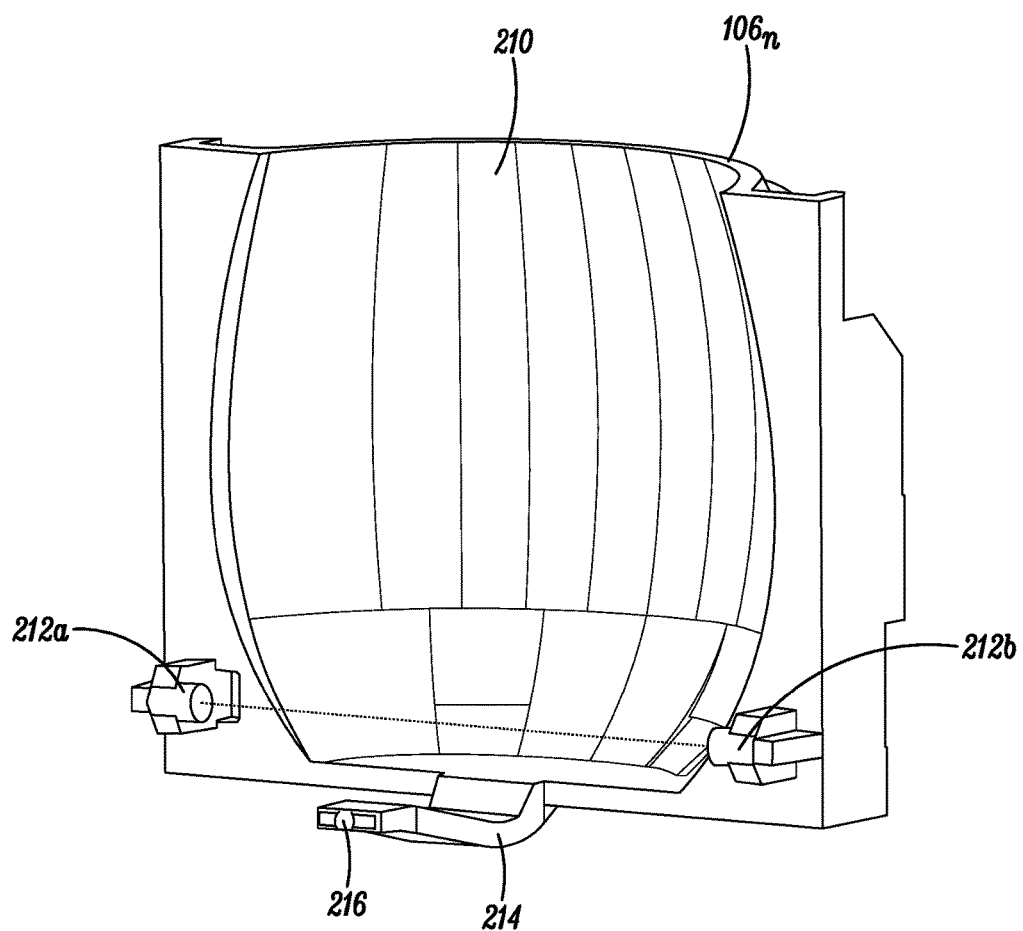
FIG. 2 illustrates a mirror of a passive infrared detector in accordance with disclosed embodiments.

FIG. 2 illustrates one of the mirrors $106_n$ in accordance with disclosed embodiments. For example, the mirror $106_n$ can include a plurality of mirrors 210, one or more axles 212a, 212b, an arm 214, and a drive ball 216. In some embodiments, the plurality of mirrors 210 can receive and reflect the infrared light toward a corresponding one of the pyro sensors $108_n$, and in some embodiments, the axles 212a, 212b can rotate the mirror $106_n$ relative to the housing 150 of the PIR detector 100 about an axis formed by the axles 212a, 212b to change a focal length of the mirror $106_n$. In some embodiments, the axles 212a, 212b can be coupled to the housing 150 of the PIR detector 100 via holes or detents in the housing 150 and can rotate within the holes or detents. In some embodiments, the arm 214 and the drive ball 216 can engage with an adjustment ring as described herein.

Figure 3A:
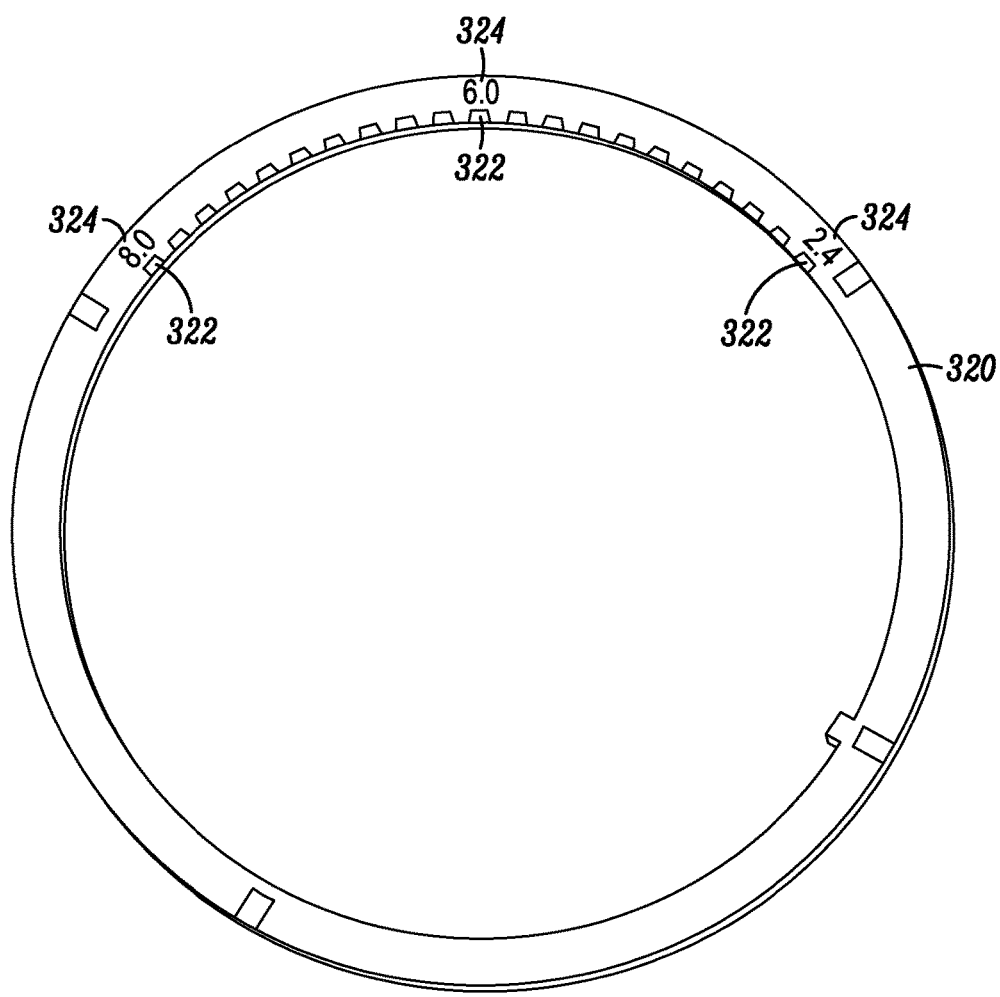
FIGS. 3A-3C illustrate an adjustment device of a passive infrared detector in accordance with disclosed embodiments.

FIG. 3A illustrates a top view of the adjustment ring 320 in accordance with disclosed embodiments. For example, the adjustment ring 320 can include a plurality of position teeth 322 and a plurality of focal length indicators 324. While FIG. 3 illustrates the adjustment ring 320 as being circular, it is to be understood that the adjustment ring 320 could be, additionally or alternatively, a circular nob, a slider, or configured electronically using a digital display.

In some embodiments, each of the plurality of position teeth 322 can correspond to a respective one of a plurality of rotation positions of the adjustment ring 320, which can correspond to a respective one of a plurality of focal lengths of the mirrors $106_1$, $106_2$, $106_3$. Furthermore, in some embodiments, each of the plurality of focal length indicators 324 can include a respective visual marker (e.g. printed on the adjustment ring 320) that displays the respective one of the plurality of focal lengths of the mirrors $106_1$, $106_2$, $106_3$ corresponding to the respective one of the plurality of rotation positions of the adjustment ring 320. For example, a first of the plurality of position teeth 322 can correspond to the focal length of a 2.4 meter mounting height, a second of the plurality of position teeth 322 can correspond to the focal length of a 6.0 meter mounting height, and a third of the plurality of position teeth 322 can correspond to the focal length of a 8.0 meter mounting height. Similarly, a first of the plurality of focal length indicators 324 reading 2.4 may be printed near the first of the plurality of position teeth 322, a second of the plurality of focal length indicators 324 reading 6.0 may be printed near the second of the plurality of position teeth 322, and a third of the plurality of focal teeth indicators $324_1$ reading 8.0 may be printed near the third of the position teeth 322.

Figure 3B:
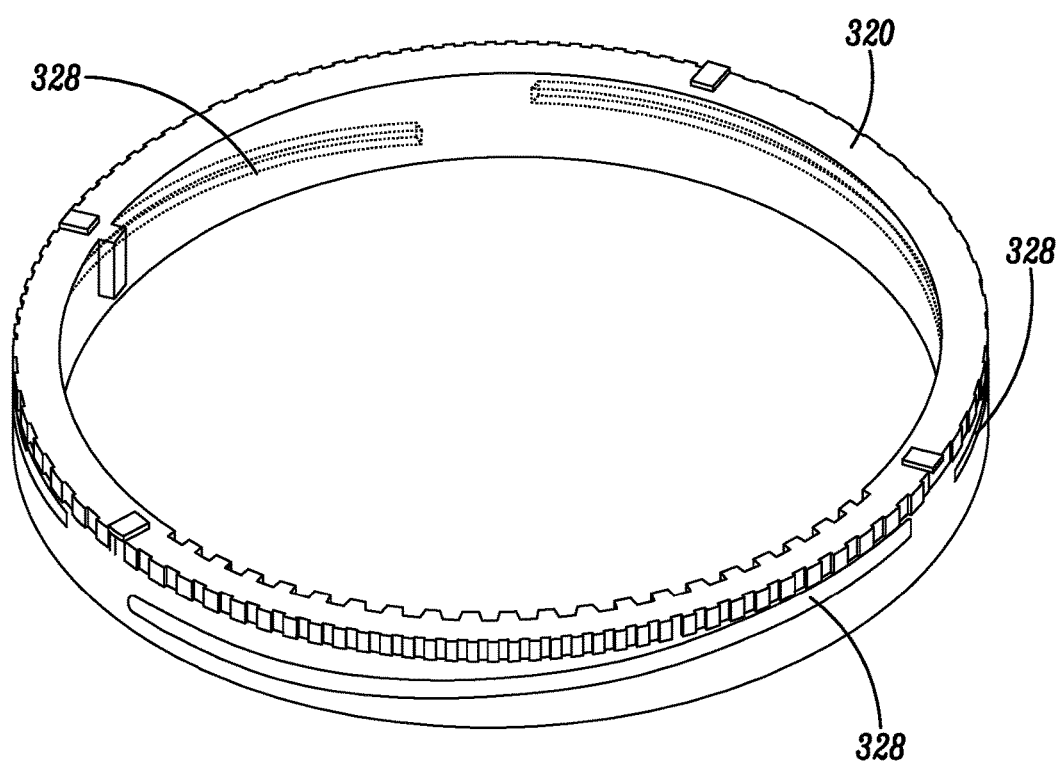

Referring now to FIG. 3B, in some embodiments, the adjustment ring 320 can include a plurality of slots 328 on sidewalls of the adjustment ring 320. Each of the plurality of slots 328 may be identical in shape and composition, but located at a respective one of a plurality of slot positions around the adjustment ring 320. In some embodiments, the plurality of slots 328 may be equally distributed around the adjustment ring 320. For example, each of the plurality of slots 328 may form a 120° arc of a circle on a circumference of the adjustment ring 320, and in some embodiments, a number of the plurality of slots and a length of each of the plurality of slots 328 may depend on a number of the mirrors $106_1$, $106_2$, $106_3$ and the pyro sensors $108_1$, $108_2$, $108_3$ in the PIR detector 100. Furthermore, in some embodiments, each of the plurality of slots 328 may comprise a respective inclined slope that slopes upward around the circumferences of the adjustment ring 320 as the adjustment ring 320 is rotated counter-clockwise or clockwise. For example, a respective first end of each of the plurality of slots $328_2$ can be lower on the circumference of the adjustment ring 320 than a respective second end of each of the plurality of slots 328, which can slope upward to from the lower respective first end to the higher respective second end.

Figure 3C:
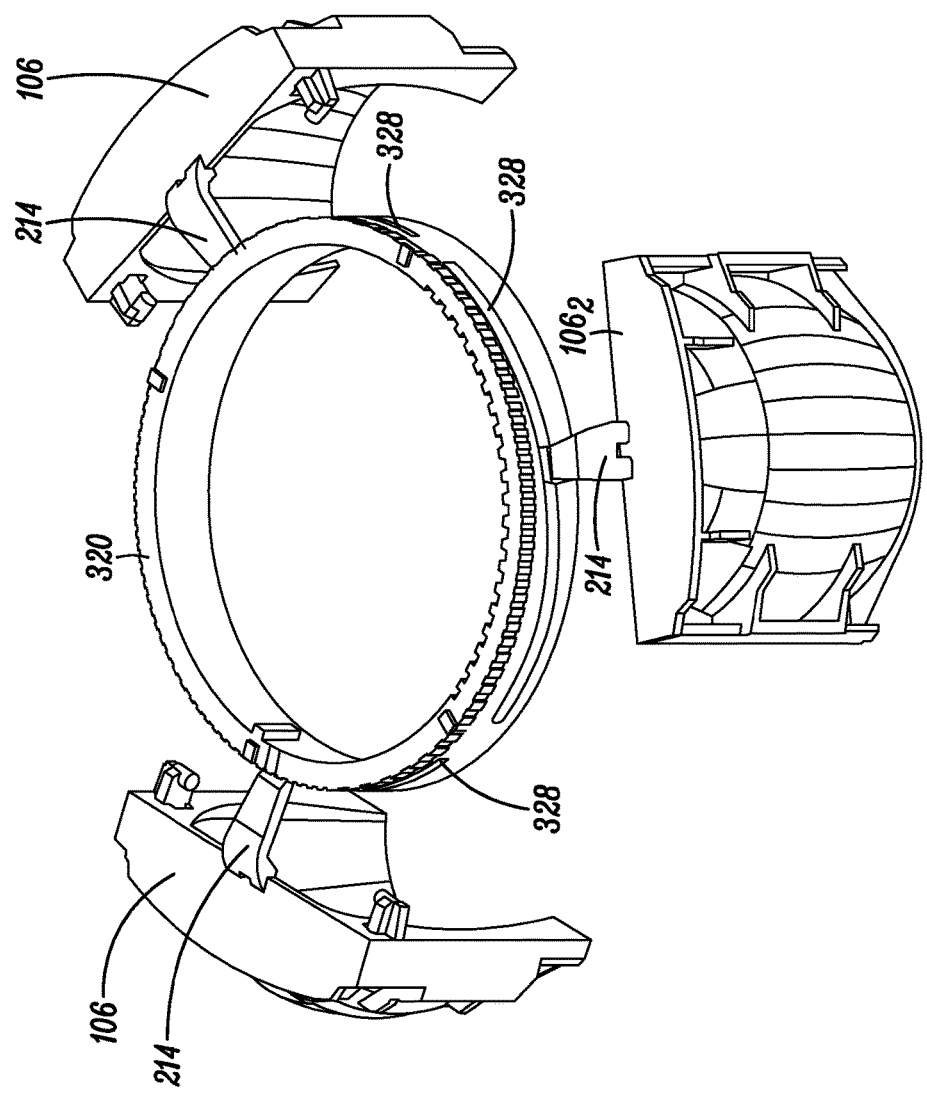

As shown in FIG. 3C, the adjustment ring 320 can engage the mirrors $106_1$, $106_2$, $106_3$. For example, each of the mirrors $106_1$, $106_2$, $106_3$ can connect to the adjustment ring 320 via a respective one of a plurality of arm 214, each of which can engage the adjustment ring 320 in a corresponding one of the plurality of slots 328. When the adjustment ring 320 is rotated, each of the plurality of arms 214 can move within the corresponding one of the plurality of slots 328 in either an upward manner or a downward manner in accordance with a respective slope of the corresponding one of the slots 328. Furthermore, the upward or downward movement of each of the plurality of arms 214 can cause a respective one of the mirrors $106_1$, $106_2$, $106_3$ to rotate about a respective one of a plurality of axle pairs 214a, 214b and change the respective one of the focal lengths of the respective one of the mirrors $106_1$, $106_2$, $106_3$. Because each of the plurality of slots 328 can be identical, each of the mirrors $106_1$, $106_2$, $106_3$ can rotate in unison with rotation of the adjustment ring 320.

Figure 4:
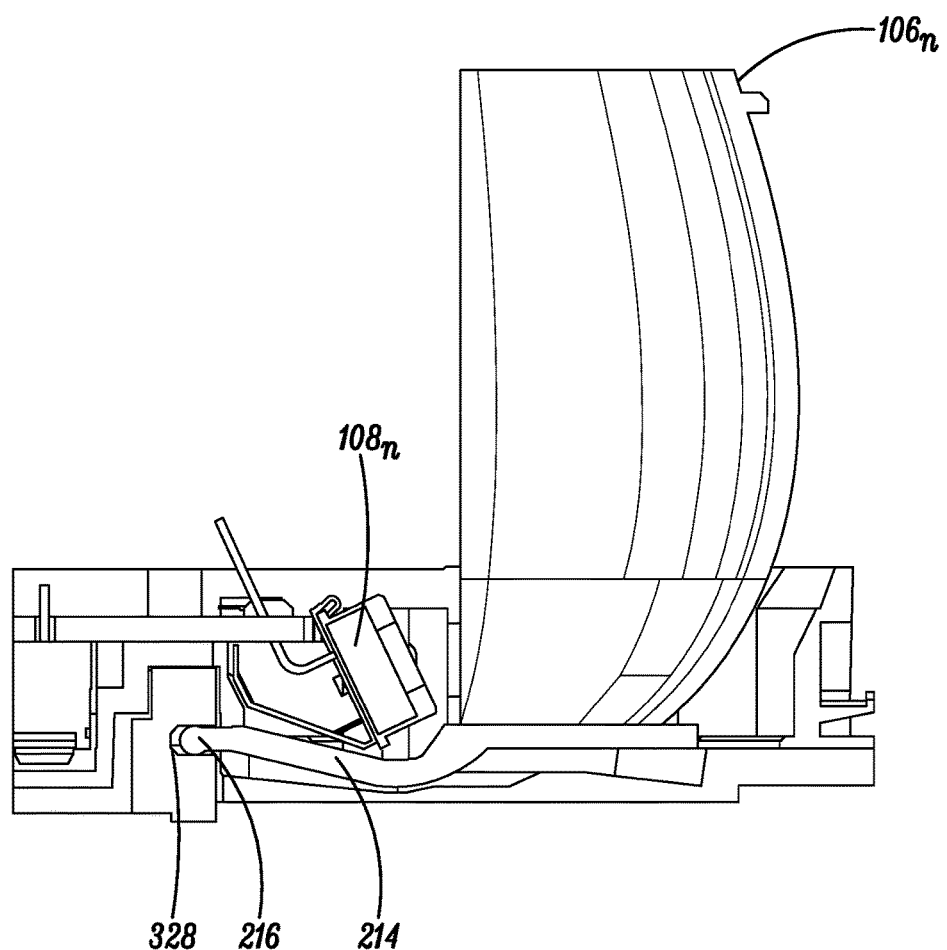
FIG. 4 illustrates a mirror interacting with an adjustment device of a passive infrared detector in accordance with disclosed embodiments.

FIG. 4 illustrates one of the mirrors $106_n$ interacting with adjustment ring 320 in accordance with disclosed embodiments. As shown, the drive ball 216 can fit within and engage the slot 328 of the adjustment ring 320, the arm 214 can connect the drive ball 216 to the mirror $106_n$, and the drive ball 216 can move upward or downward based on a slope of the slot 328, thereby causing the mirror $106_n$ to rotate relative to the pyro sensor $108_n$ and change the focal length of the mirror $106_n$.

Figure 5:
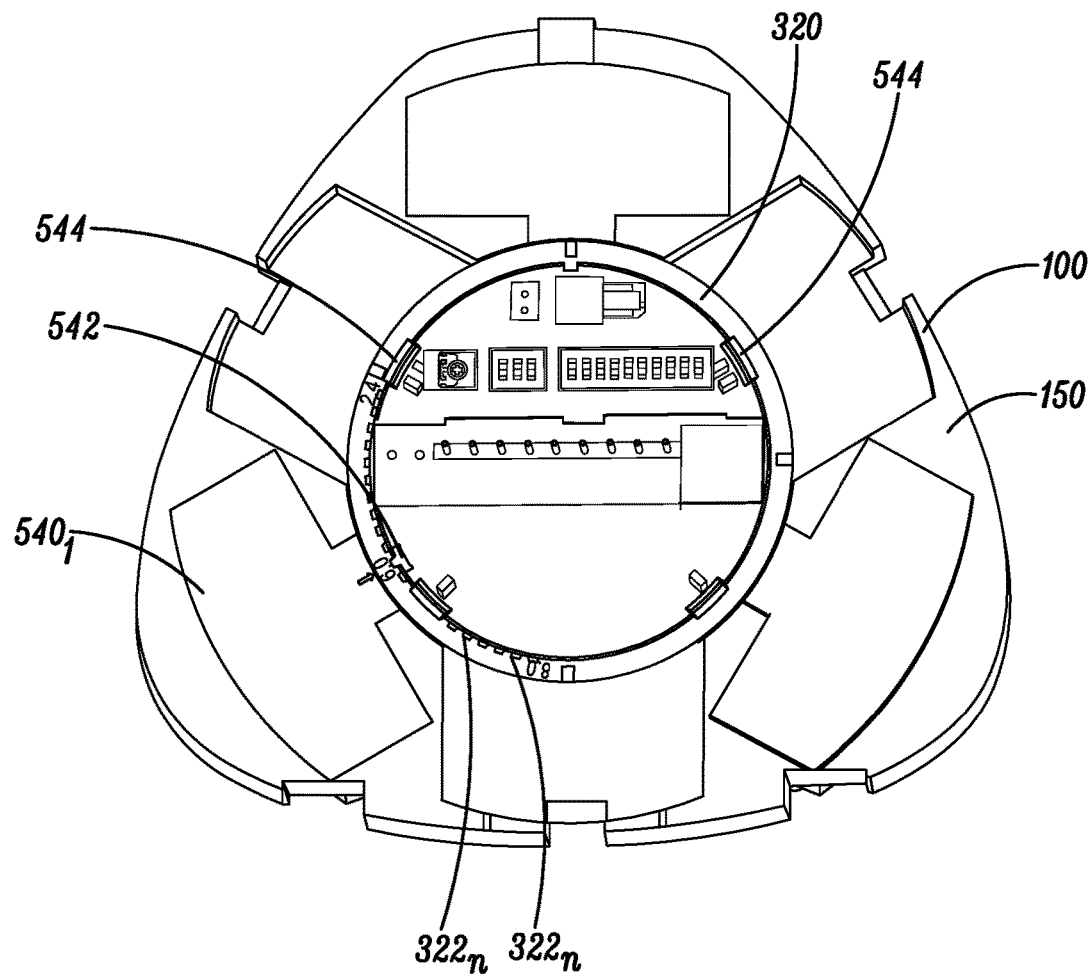
FIG. 5 illustrates a passive infrared detector in accordance with disclosed embodiments.

FIG. 5 illustrates the PIR detector 100 in accordance with disclosed embodiments with a middle cover 540 that may conceal and protect the mirrors $106_1$, $106_2$, $106_3$ (not shown in FIG. 5). For example, each of the mirrors $106_1$, $106_2$, $106_3$ may be protected by the middle cover 540. In some embodiments, the adjustment ring 320 may be externally located on the housing 150 and the middle cover 540 so that the mirrors $106_1$, $106_2$, $106_3$ may be adjusted without removing any parts or pieces of the PIR detector 100.

In some embodiments, the housing 150 may include a position stop device 542 that can engage one or more of the plurality of teeth 322 of the adjustment ring 320 to stabilize the adjustment ring 320 in one position once a user has selected the focal length for the mirrors $106_1$, $106_2$, $106_3$ and rotated the adjustment ring 320 to the respective one of the plurality of rotation positions location based on a corresponding one of the plurality of teeth 322. Furthermore, in some embodiments, the housing 150 may include tabs 542 to couple the adjustment ring 320 to the housing 150 and allow the adjustment ring 320 to rotate.

Figure 6A:
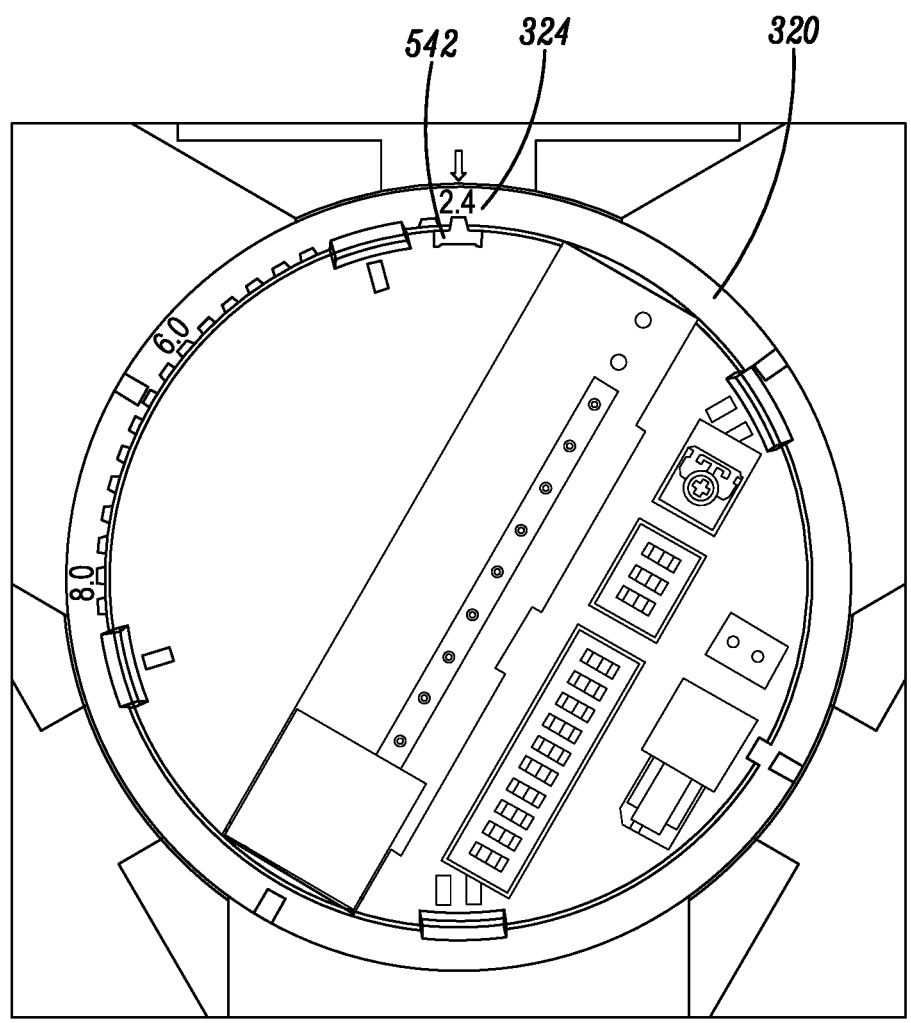
FIGS. 6A and 6B illustrate a first position of an adjustment device and a corresponding first position of a mirror of a passive infrared detector in accordance with disclosed embodiments.
Figure 6B:
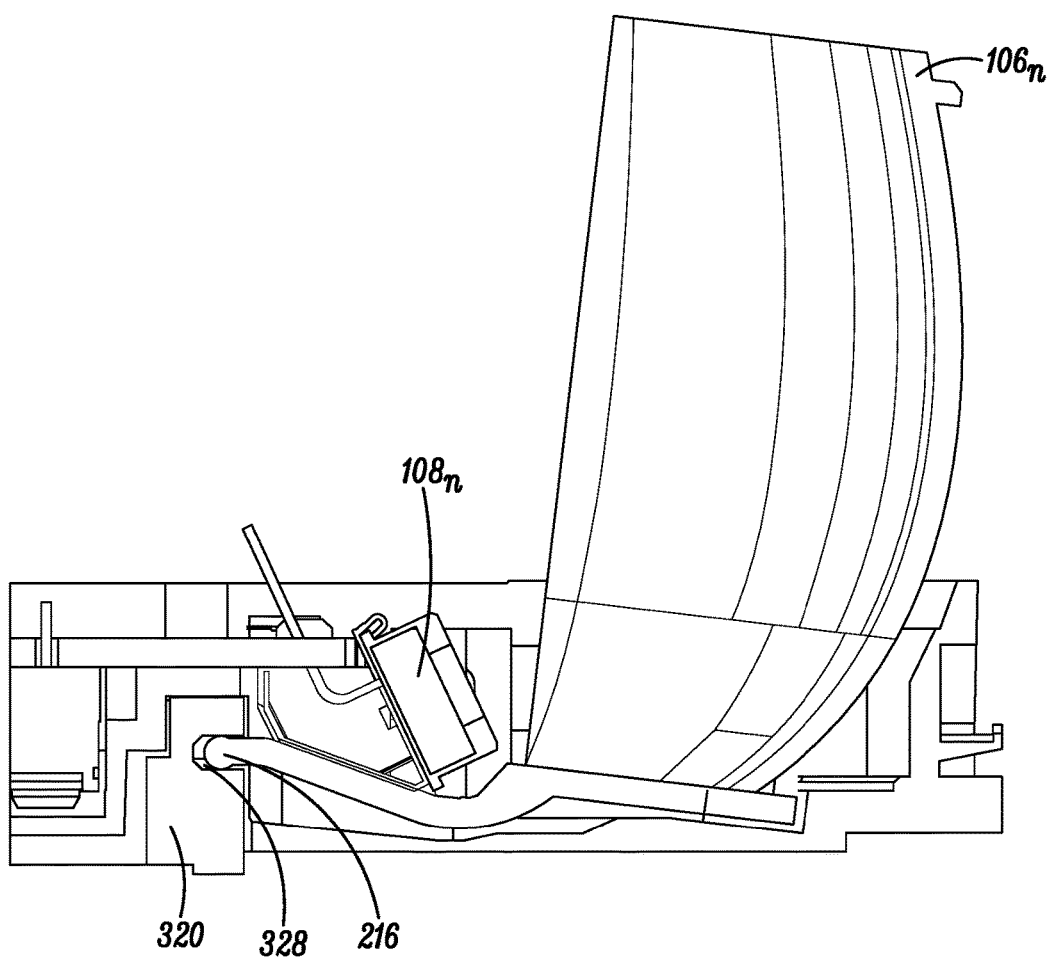

FIGS. 6-8 illustrate example positions of the adjustment ring 320 and one of the mirrors $106_n$. For example, as shown in FIG. 6A, the adjustment ring 320 may be rotated so that the position stop 542 engages a first of the plurality of teeth 324 of the adjustment ring 320. As shown in FIG. 6B, the mirror $106_n$ can be rotated in a corresponding manner so that the drive ball 216 can engage the slot 328 at a corresponding height on the adjustment ring 320, which can cause the mirror $106_n$ to rotate to a first of the plurality of rotation positions.

Figure 7A:
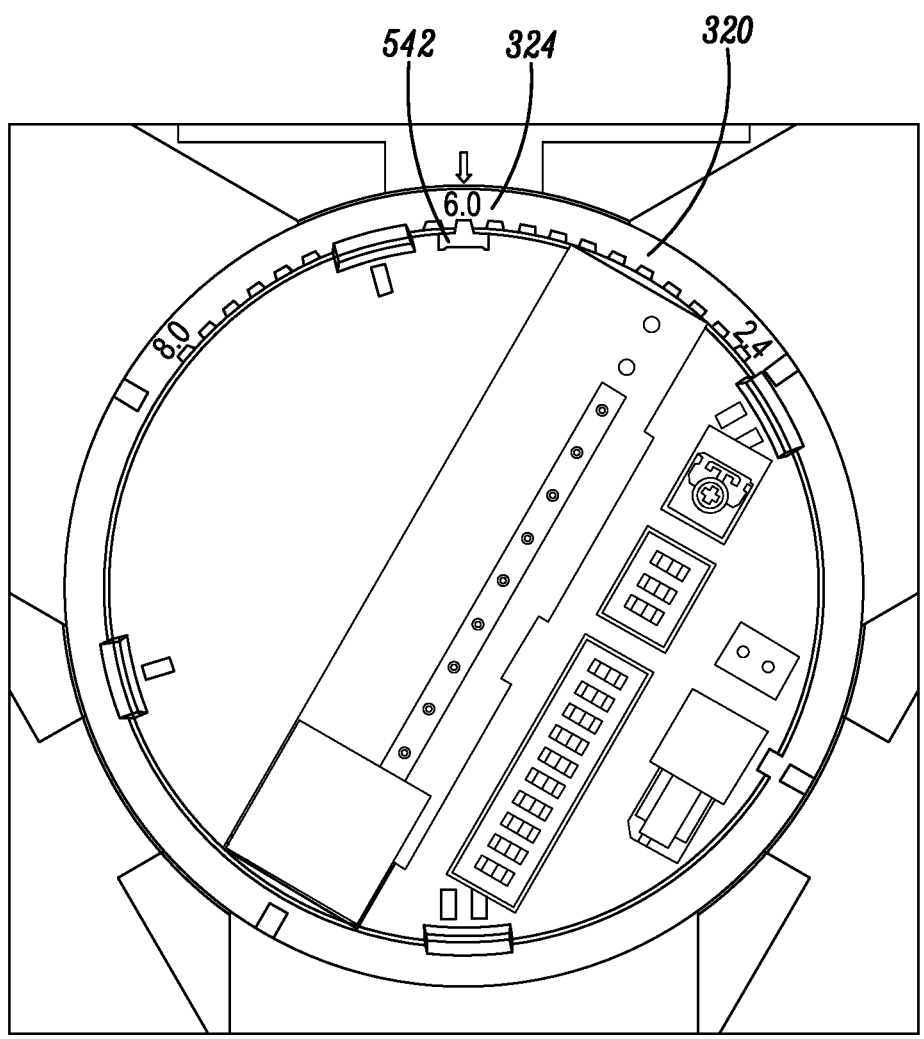
FIGS. 7A and 7B illustrate a second position of an adjustment device and a corresponding second position of a mirror of a passive infrared detector in accordance with disclosed embodiments.
Figure 7B:
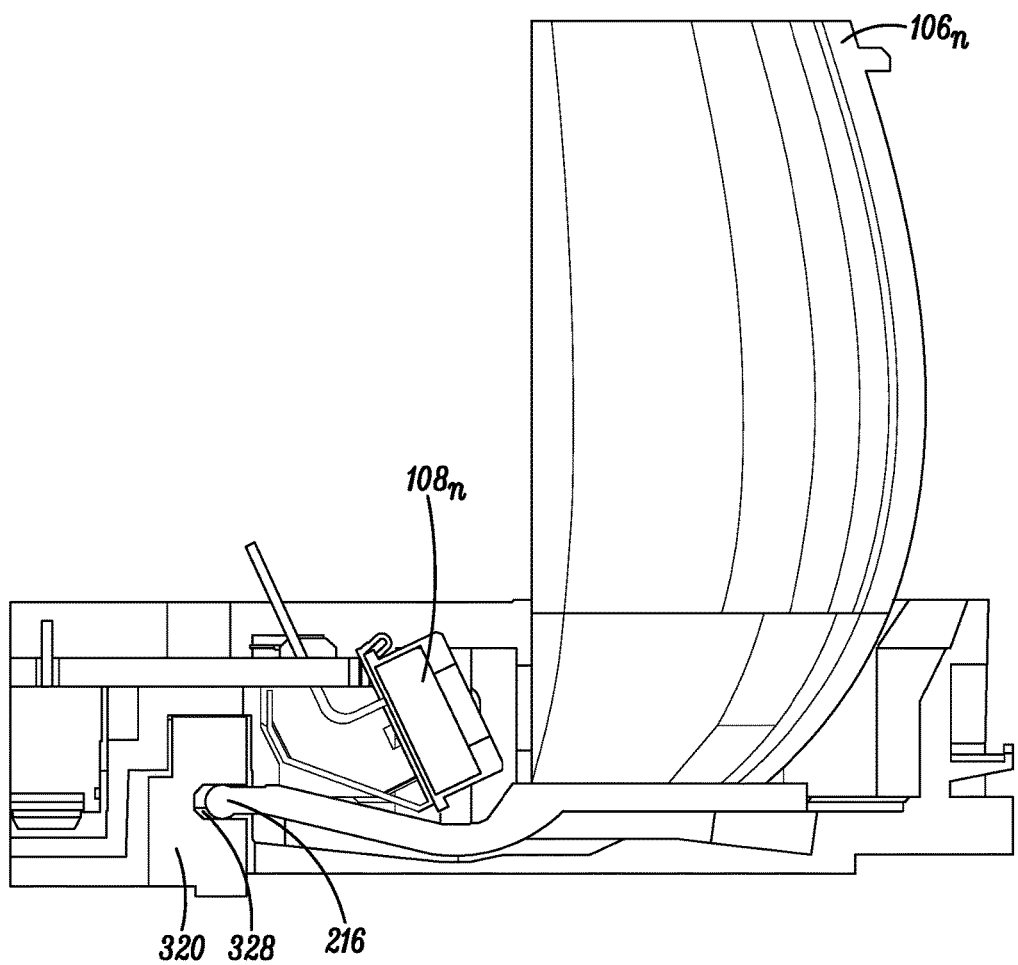

Similarly, as shown in FIG. 7A, the adjustment ring 320 may be rotated so that the position stop 542 engages a second of the plurality of teeth 324 of the adjustment ring 320. As shown in FIG. 7B, the mirror $106_n$ can be rotated in a corresponding manner so that the drive ball 216 can engage the slot 328 at a corresponding height on the adjustment ring 320 (lower than shown in FIG. 6B), which can cause the mirror $106_n$ to rotate to a second of the plurality of rotation positions.

Figure 8A:
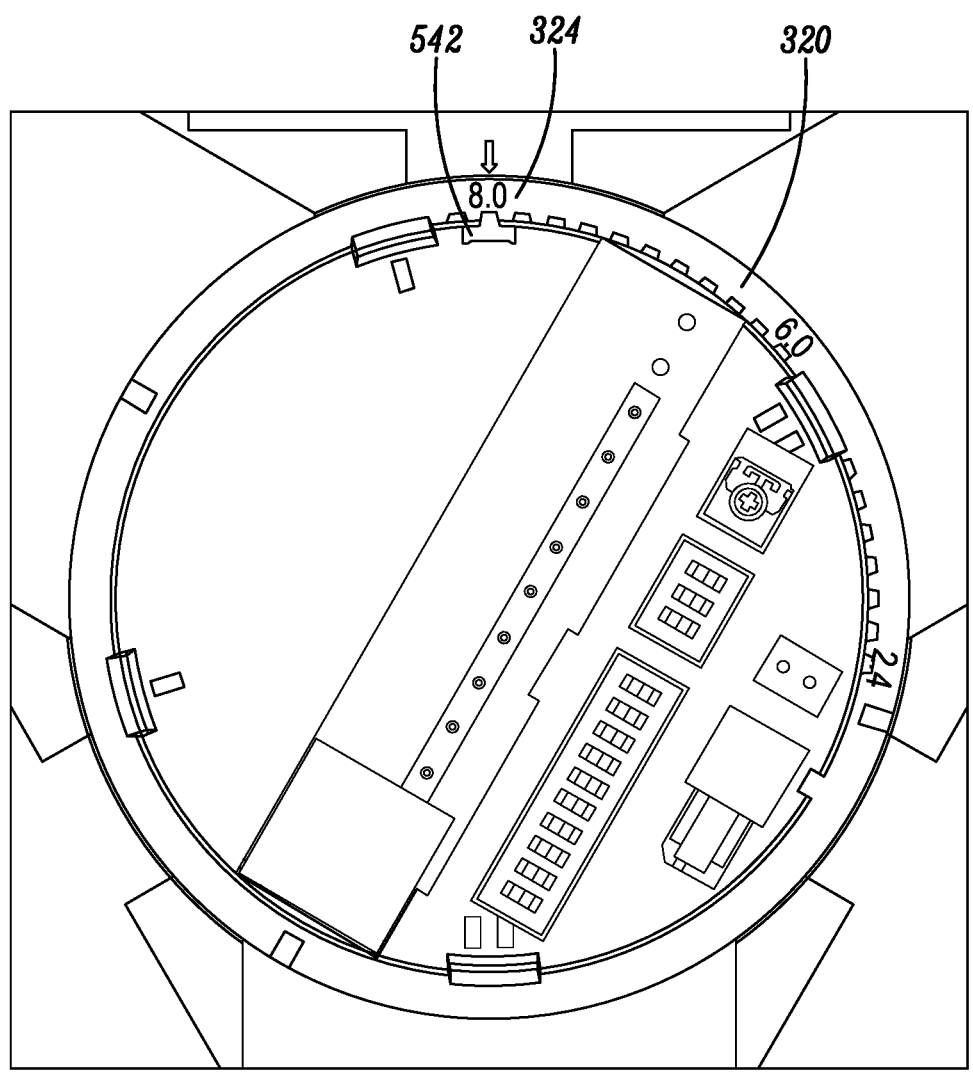
FIGS. 8A and 8B illustrate a third position of an adjustment device and a corresponding third position of a mirror of a passive infrared detector in accordance with the disclosed embodiments.
Figure 8B:
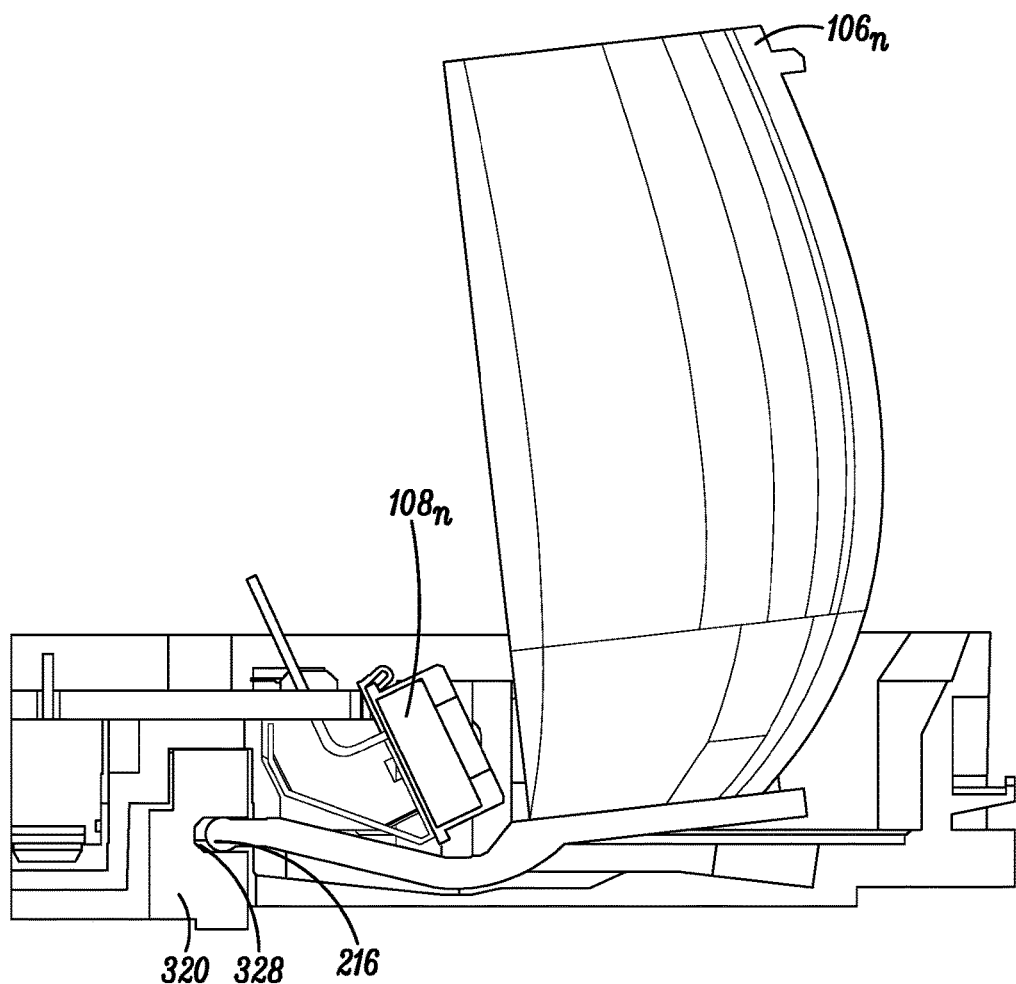

Similarly, as shown in FIG. 8A, the adjustment ring 320 may be rotated that the position stop 542 engages a third of the plurality of teeth 324 of the adjustment ring 320. As shown in FIG. 8B, the mirror $106_n$ can be rotated in a corresponding manner so that the drive ball 216 can engage the slot 328 at a corresponding height on the adjustment ring 320 (lower than shown in FIG. 7B), which can cause the mirror 106 to rotate to a third of the plurality of rotation positions.

FIGS. 6A-8B illustrate the adjustment ring 320 having three teeth and the mirror 106$_n$ having three rotation positions. However, it is to be understood that the adjustment ring 320 may have more or fewer than three teeth and that the mirror 106$_n$ may have more or fewer than three rotation positions. For example, the adjustment ring 320 may have 22 teeth, each of which can correspond to a respective one of 22 different focal lengths for the mirrors 106$_1$, 106$_2$, 106$_3$.

While the exemplary embodiments described above discuss a PIR sensor with mirrors, the adjustment ring 320 can also be adapted to adjust the focal length of lenses by replacing the mirrors 106$_1$, 106$_2$, 106$_3$ with lenses.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
an adjustment ring having a slot;
a mirror that is rotatable about an axis; and
a drive coupled to the mirror and configured to engage the slot,
wherein rotation of the adjustment ring causes the drive to move within the slot upwards or downwards in accordance with an inclined slope of the slot, thereby rotating the mirror about the axis.

2. The system of claim 1 wherein rotation of the mirror changes a focal length of the mirror.

3. The system of claim 2 further comprising:
a plurality of position teeth arrayed around a circumference of the adjustment ring,
wherein each of the plurality of position teeth corresponds to a respective one of a plurality of focal lengths of the mirror.

4. The system of claim 3 further comprising:
a position stop configured to engage with one of the plurality of position teeth and hold the adjustment ring in a selected position.

5. The system of claim 3 further comprising:
a pyro sensor configured to receive infrared light reflected by a plurality of mirrors that includes the mirror.

6. The system of claim 1 wherein the drive includes an arm and a drive ball, wherein the drive ball engages the slot, and wherein the arm couples the drive ball to the mirror.

7. The system of claim 1 wherein the slot slopes upward as the adjustment ring is rotated counter-clockwise.

8. The system of claim 1 wherein the adjustment ring rotates about tabs in a housing.

9. A system comprising:
an adjustment device having a first slot and a second slot;
a first mirror that is rotatable about a first axis;
a second mirror that is rotatable about a second axis;
a first drive coupled to the first mirror and configured to engage the first slot; and
a second drive coupled to the second mirror and configured to engage the second slot,
wherein movement of the adjustment device causes the first drive to move within the first slot upwards or downwards in accordance with a first inclined slope of the first slot, thereby rotating the first mirror about the first axis, and
wherein the movement of the adjustment device causes the second drive to move within the second slot upwards or downwards in accordance with a second inclined slope of the second slot, thereby rotating the second mirror about the second axis.

10. The system of claim 9 wherein the adjustment device includes an adjustment ring, and wherein the adjustment ring rotates to move the first drive within the first slot and the second drive within the second slot.

11. The system of claim 10 wherein rotation of the first mirror changes a first focal length of the first mirror, wherein rotation of the second mirror changes a second focal length of the second mirror, and wherein the first focal length is equal to the second focal length.

12. The system of claim 11 further comprising:
a plurality of position teeth arrayed around a circumference of the adjustment ring,
wherein each of the plurality of position teeth corresponds to a respective one of a plurality of focal lengths of the first and second mirrors.

13. The system of claim 12 further comprising:
a position stop configured to engage with one of the plurality of position teeth and hold the adjustment ring in a selected position.

14. The system of claim 12 further comprising:
a first pyro sensor configured to receive first infrared light reflected by a first plurality of mirrors that includes the first mirror; and
a second pyro sensor configured to receive second infrared light reflected by a second plurality of mirrors that includes the second mirror.

15. The system of claim 9 wherein the first drive includes a first arm and a first drive ball, wherein the first drive ball engages the first slot, and wherein the first arm couples the first drive ball to the first mirror.

16. The system of claim 9 wherein the first slot and the second slot are identical in shape, and wherein the movement of the adjustment device causes the first mirror and the second mirror to rotate simultaneously and substantially identically.

17. The system of claim 10 wherein each of the first and second slots slopes upward as the adjustment ring is rotated counter-clockwise.

18. The system of claim 9 further comprising:
a third mirror that is rotatable about a third axis; and
a third drive coupled to the third mirror and configured to engage a third slot in the adjustment device,
wherein the movement of the adjustment device causes the third drive to move within the third slot upwards or downwards in accordance with a third inclined slope of the third slot, thereby rotating the third mirror about the third axis.

19. A passive infrared detector comprising:
a housing;
a first passive infrared sensor;
a second passive infrared sensor;
an adjustment device having a first slot and a second slot;
a first mirror coupled to the housing, rotatable about a first axis, and configured to reflect infrared light towards the first passive infrared sensor;

a second mirror coupled to the housing, rotatable about a second axis, and configured to reflect the infrared light towards the second passive infrared sensor;

a first drive coupled to the first mirror and configured to engage the first slot; and a second drive coupled to the second mirror and configured to engage the second slot, wherein movement of the adjustment device causes the first drive to move within the first slot upwards or downwards in accordance with a first inclined slope of the first slot, thereby rotating the first mirror about the first axis and changing a focal length of the first mirror, and wherein the movement of the adjustment device causes the second drive to move within the second slot upwards or downwards in accordance with a second inclined slope of the second slot, thereby rotating the second mirror about the second axis and changing a focal length of the second mirror.

* * * * *